May 23, 1967  N. L. STAUFFER  3,321,769

RECORDING APPARATUS WITH MEANS FOR PREVENTING OVEREXPOSURE

Filed Aug. 24, 1965

INVENTOR.
NORMAN L. STAUFFER
BY
ATTORNEY.

United States Patent Office 3,321,769
Patented May 23, 1967

3,321,769
RECORDING APPARATUS WITH MEANS FOR PREVENTING OVEREXPOSURE
Norman L. Stauffer, Englewood, Colo., assignor to Honeywell Inc., Minneapolis, Minn., a corporation of Delaware
Filed Aug. 24, 1965, Ser. No. 482,063
4 Claims. (Cl. 346—109)

ABSTRACT OF THE DISCLOSURE

An oscillographic recorder having a radiation sensitive recording surface and a primary source of radiation which is focused into a spot for forming a trace on the recording surface. A second source of radiation is focused into a second spot for recording the intensity of the trace formed on the recording surface, by either quenching or pre-exposure, when a phenomenon being recorded is not undergoing a variation.

---

A general object of the present invention is to provide certain novel and desirable improvements in oscillographic apparatus of the direct print-out or direct writing type. Typical examples of one form of such apparatus are the recording oscillographs disclosed in U.S. Patent No. 2,580,427, issued Jan. 1, 1952 to C. A. Heiland and in U.S. Patent No. 3,066,299, issued Nov. 27, 1962 to R. S. Kampf. Another form is the phosphor belt display oscillographic apparatus disclosed in U.S. Patent No. 3,269,262, issued Aug. 20, 1966 to R. S. Kampf. In each form of oscillographic apparatus the image or trace produced is immediately visible and is accomplished by means of a beam of radiant energy which is focused into an intense spot which forms the trace upon a movable indicating or recording surface. The recording surface is treated with an emulsion or coating which is matched with or is sensitive to the wavelengths of the radiant energy beam. The radiant energy beam focused into a spot and the resulting trace are deflected transversely to the direction of the recording surface motion, in accordance with the phenomenon to be recorded. To this end a suitable optical arrangement is provided for deflecting the radiant energy beam from a mirror carried by a sensitive galvanometer which in turn is operative to deflect in accordance with the variations in the phenomenon to be recorded.

In oscillographic recording apparatus it is desirable to reduce the exposure or intensity of a slowly varying or static trace to prevent overexposure, while allowing full trace intensity when the trace producing spot moves rapidly in a transverse direction to the recording surface motion. In the phosphor belt display oscillographic apparatus it is useful to reduce the trace intensity for channels on which no signals are applied and to increase the brightness of those channels having varying signals so that the resultant traces of the varying signals will stand out to the observer.

Accordingly, a more specific object of the present invention is to provide a simple and efficient mechanism by which the recording trace intensity in oscillographic apparatus may be automatically controlled as necessary to prevent over exposure of slowly varying traces but to allow full trace intensity when the trace producing spot moves rapidly in a transverse direction to the motion of the recording surface.

A better understanding of the present invention may be had from the following description when read in connection with the accompanying drawings in which.

Figure 1:
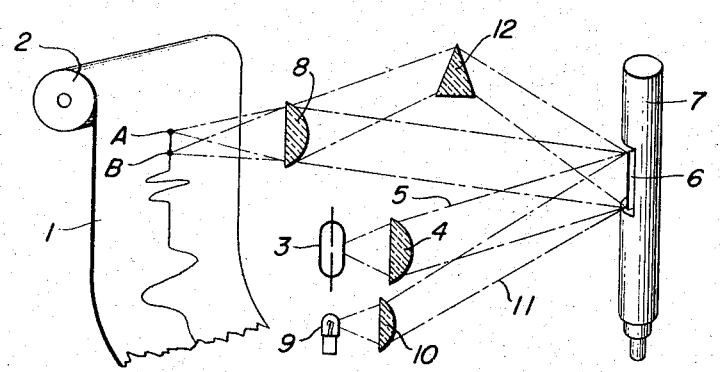
FIG. 1 is a diagram showing the optical arrangement of a preferred embodiment of the present invention.

In the production of oscillographic recordings, whether permanent or temporary in nature, it is desirable to derive full intensity of the trace upon the sensitive recording surface when the phenomena under observation is changing rapidly thereby causing the trace producing spot to move rapidly across the recording surface. When the phenomena under observation is undergoing little or no change and the trace producing spot is stationary or moving slowly, it is desirable to reduce the degree of exposure of the rest of the recording surface upon which the trace is produced thereby preventing over exposure and reducing the intensity of the trace. While in the drawings but a single galvanometer is illustrated, it will be understood that the novel optical arrangement comprising the present invention may be embodied in oscillographic recording apparatus and phosphor belt display oscillographic apparatus having as many galvanometers as desired, for example 6, 12, 24, 36, or 50 are found in present day commercial oscillographic instruments.

The automatic control of the exposure or intensity of the recording trace has utility in a phosphor belt display oscillographic instrument, such as disclosed in the aforementioned Kampf Patent No. 3,296,262 as well as in an oscillographic recording instrument, such as disclosed in the aforementioned Kampf Patent No. 3,066,299. In the phosphor belt display type of instrument it is useful to reduce the trace intensity for channels with no signals while increasing the trace brightness of those channels which have a varying signal thereby causing said varying channels to stand out to the observer. In order to accomplish this on the phosphor belt type of oscillographic instrument, as is illustrated in FIG. 1, the exposed area of a phosphor belt indicated at 1 is given a second exposure to a secondary form of radiation, such as infrared, which will reduce or quench the subsequent phosphorescence. The phosphor belt 1 is guided over a platen or roll 2 and is directed in a downward direction past the trace producing plane of the instrument.

As seen in FIG. 1 the source of the trace producing beam of radiation is a device 3 which may comprise a two-element, mercury vapor electric lamp enclosed in a quartz envelope and which is adapted to emit a beam of high intensity ultraviolet light. An example of such a lamp is the Osram lamp having an 0.012 inch diameter and which is manufactured by the Osram Company in Germany, and is identified as its Model HB0109. The beam of radiant energy from lamp 3 is concentrated by a collector lens 4 into a primary focal path 5 and is directed to a deflecting mirror 6 of a galvanometer 7. The ultraviolet light reflecting from the mirror 6 of the galvanometer is focused by a recording lens 8 into a spot of high intensity upon the sensitive surface of belt 1. It should be noted that the intensity of the spot remains constant while the intensity of the trace produced by the spot is varied in accordance wih the procedure to be described hereinafter.

In accordance with the present invention, the exposed area indicated at A on the phosphor belt 1 is given a secondary subsequent exposure, but to infrared which will reduce or quench the subsequent phosphorescence or intensity. This secondary or quench exposure is applied by an optical mechanism, as illustrated in FIG. 1, comprising a source of infrared radiation indicated at 9. The source of infrared radiation 9 may comprise a socalled Globar unit or other suitable source of infrared radiation. The infrared radiation from the source 9 is focused by a suitable collector lens 10 into a secondary focal path 11 upon the mirror 6 of galvanometer 7 and is reflected therefrom toward a prism 12. The infrared radiation passes through the prism 12 and is focused into a second spot by the recording lens 8 on the phosphor belt 1 at the area indicated at B. It will be understood that a mirror may be used instead of the prism 12 or the beam could be arranged to fall directly onto the surface of the phosphor belt 1 without the use of the recording lens 8. In the latter event the image produced by the infrared radiation would be a line rather than a spot.

Figure 2:
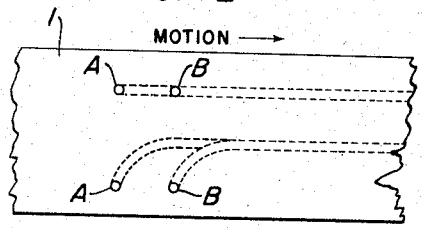
FIG. 2 is a diagrammatic view illustrating the production of a static and rapidly varying trace.

With particular reference to the top portion of FIG. 2, it will be apparent that, when the phenomenon under observation is undergoing no change, the paths of the spots A and B overlap in consequence of which the trace produced by the spot at the area A is quenched by the infrared radiation of the spot at the area B. This quenching occurs as the phosphor belt moves downwardly away from the trace producing region in the absence of a variation of the phenomena under observation thereby preventing overexposure and reducing intensity. On the other hand, upon deflection of the galvanometer mirror 6, in response to a change in the phenomena under observation, it will be seen, in the lower portion of FIG. 2, that the spots produced at the areas A and B take independent transverse paths on the phosphor belt surface, thereby allowing the spot produced at area A to be fully effective, without subsequent quenching, to produce the desired fully intensified trace. That is, the spot produced at area B in this case is not effective to quench the trace produced by the spot at A.

As those familiar with the art will understand, the infrared radiation produced by the spot at area B can be so directed onto the sensitive phosphor belt surface that it will strike that surface prior to the exposure to the radiation emanating from the mercury vapor lamp 3, if this is deemed necessary or desirable.

In the optical arrangement of FIG. 1 it is noted that the quench spot at area B on the sensitive surface only follows behind the exposed phosphor produced by the spot at area A when the spot is transversely motionless, as is indicated in the top portion of FIG. 2. If the galvanometer mirror is deflecting in response to a rapid change in the phenomena under observation, causing the spot produced at area A to move transversely to the recording surface motion, the exposed area A on the sensitive surface is not quenched by the spot produced at area B and the full phosphor intensity of the trace is obtained. As soon as the signal induced traverse motion of the spot at the area A ceases, that spot is again quenched by the spot at area B and the resulting trace intensity is reduced.

Figure 3:
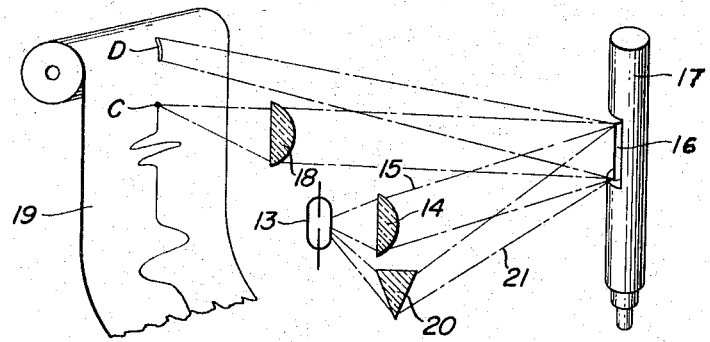
FIG. 3 illustrates a modified form of the optical arrangement of FIG. 1.
Figure 4:
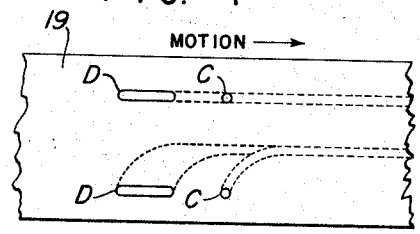
FIG. 4 is a diagrammatic illustration of the production of static and rapidly moving traces associated with the arrangement of FIG. 3.

In the case of oscillographic recording, as indicated in FIG. 3, a source of radiant energy is produced by a lamp 13, similar to the lamp 3, which is focused through a collector lens 14 into a primary focal path 15 directed toward a reflecting mirror 16 of a galvanometer 17. The radiant energy reflected from the galvanometer mirror 16 is focused by a recording lens 18 into an area of high intensity radiation in the form of a spot C on a recording surface 19. A prism 20 focuses radiant energy from the lamp 13 into a secondary focal path 21 which reflects from the galvanometer mirror 15 onto the recording surface 19 in the form of a low level radiation indicated at area D. The low level radiation area D pre-exposes the recording surface 19; consequently, a reduced trace intensity results at the spot area C. For a transversely deflected spot, on the other hand, area C is no longer preceded by the pre-exposed area D and full trace intensity of the desired trace area C results. This is illustrated by the lower portion of FIG. 4, in which it is seen that the path of the pre-exposure area D and the path of the desired trace producing spot C do not overlap upon rapid deflection of the galvanometer mirror.

It will be obvious to those skilled in the art, that a limiting aperture could be placed within the secondary focal path 21 for preventing the exposure of the recording surface 19 to the pre-exposure radiation area D during the transverse deflection of the areas C and D.

It should be apparent from the description hereinabove that the applicant has provided a novel apparatus for automatically controlling the intensity of the recording trace utilized by oscillographic apparatus. Obviously, many modifications and variations of the present invention are possible in light of the above teachings; and the invention, therefore, should be limited only by the appended claims.

What is claimed is:

1. A device for automatically controlling the intensity of a recording trace in an oscillographic apparatus comprising
   a source of radiant energy,
   a recording surface sensitive to said radiant energy,
   first focal means for focusing said radiant energy into a primary focal path directed toward said recording surface for forming a primary area thereon,
   said first focal means including further means for focusing said primary area into an individual recording trace upon said recording surface,
   secondary focal means for focusing said radiant energy into a secondary focal path directed toward said recording surface for forming a secondary area thereon in overlapping alignment with said primary trace forming area for reducing the intensity of said individual recording trace, and
   means disposed in said primary and secondary focal paths for displacing the position of said primary trace forming area and said secondary area upon said recording surface thus displacing said overlapping alignment therebetween and allowing said individual recording trace to become fully intensified.

2. A device for automatically controlling the intensity of a recording trace in an oscillographic apparatus comprising
   a source of radiant energy,
   a galvanometer having a reflective mirror therein and adapted for deflection,
   a recording surface sensitive to said radiant energy arranged to be moved along an axis thereof,
   first focal means for focusing said radiant energy into a primary focal path reflected by said galvanometer mirror upon said recording surface for forming a primary area on said recording surface and creating an individual recording trace thereon which moves along the axis of said recording surface in the absence of a deflection of said galvanometer,
   second focal means for focusing said radiant energy into a secondary focal path reflected by said same galvanometer mirror upon said recording surface for forming a secondary area thereon in alignment with the axis of said recording surface upon which said individual recording trace is formed for overlapping said individual recording trace and reducing the intensity of said trace in the absence of a deflection of said galvanometer, whereby an occurrence of said galvanometer deflection causes said secondary area to cease overlapping said individual recording trace for allowing said individual recording trace to become fully intensified.

3. In an oscillographic apparatus including a galvanometer having a reflective mirror therein for reflecting a beam of radiant energy onto a recording surface sensitive to said radiant energy and thereby produce a trace upon said recording surface, the improvements comprising
   an ultraviolet light source for producing a primary portion of said beam of radiant energy, an infrared light source for producing a secondary portion of said beam of radiant energy, lens means for focusing said ultraviolet light into a primary focal path and directing said focal path toward said galvanometer reflective mirror, second lens means for focusing said infrared light into a secondary focal path and directing said focal path toward said galvanometer reflective mirror, recording lens means for focusing said reflected primary focal path of ultraviolet light into a spot upon said recording surface for forming a trace thereon, and prism means for focusing said reflected secondary focal path of infrared light onto said recording lens thereby focusing a second spot upon said recording surface, whereby the paths of said trace producing spot and said second spot overlap, in the absence of a deflection of said galvanometer, for allowing said second spot to reduce the intensity of said trace, and wherein the occurrence of a deflection of said galvanometer causes a cessation of said spot paths overlapping for allowing said trace to become fully intensified.

4. In an oscillographic apparatus including galvanometer having a reflective mirror therein for reflecting a beam of radiant energy onto a recording surface sensitive to said radiant energy and thereby produce a trace upon said recording surface, the improvements comprising a source of radiant energy, first lens means for focusing said radiant energy into a primary focal path and directing said primary focal path toward said galvanometer reflective mirror, second lens means for focusing the reflected primary focal path of radiant energy from said galvanometer mirror into a spot upon said recording surface for forming an individual recording trace thereon, focal means for focusing said radiant energy into a secondary focal path directed toward said galvanometer reflective mirror, and said focal means and said galvanometer mirror arranged for reflecting said secondary path of radiant energy upon said recording surface for forming a pre-exposed area thereon overlapping said trace forming spot for allowing said pre-exposed area to limit the intensity of said trace in the absence of a deflection of said galvanometer, whereby the occurrence of a deflection of said galvanometer causes a cessation of said overlapping of said trace forming spot and said pre-exposed area for allowing said individual recording trace to become fully intensified.

References Cited by the Examiner

UNITED STATES PATENTS 3,129,999  4/1964  Brown _____ 436—109

RICHARD B. WILKINSON, *Primary Examiner.*

L. M. LORCH, *Assistant Examiner.*